US009231977B2

(12) United States Patent
Biswas et al.

(10) Patent No.: US 9,231,977 B2
(45) Date of Patent: Jan. 5, 2016

(54) METHOD AND APPARATUS FOR PROVIDING COLLABORATIVE PRIVACY POLICIES FOR A SHARED DEVICE

(71) Applicant: Nokia Corporation, Espoo (FI)

(72) Inventors: Debmalya Biswas, Lausanne (CH); Julian Nolan, Pully (CH); Matthew John Lawrenson, Bussigny-pres-de-lausanne (CH)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/139,331

(22) Filed: Dec. 23, 2013

(65) Prior Publication Data

US 2015/0180902 A1   Jun. 25, 2015

(51) Int. Cl.
*H04L 29/06* (2006.01)
*H04W 52/02* (2009.01)

(52) U.S. Cl.
CPC .............. *H04L 63/20* (2013.01); *H04L 63/101* (2013.01); *H04W 52/0274* (2013.01)

(58) Field of Classification Search
CPC ......... H04L 63/10; H04L 67/10; H04L 63/20; H04L 63/101; G06F 21/44; G06F 3/0484; H04W 52/0274
USPC ...................................................... 726/4, 27
See application file for complete search history.

(56) References Cited

U.S. PATENT DOCUMENTS

| 2005/0010820 A1* | 1/2005 | Jacobson | 713/201 |
|---|---|---|---|
| 2009/0150968 A1 | 6/2009 | Ozzie et al. | |
| 2010/0105632 A1* | 4/2010 | Henderson et al. | 514/54 |
| 2011/0177845 A1* | 7/2011 | Fasold | 455/566 |
| 2013/0060924 A1* | 3/2013 | Zhang et al. | 709/223 |

FOREIGN PATENT DOCUMENTS

EP    2528006 A1    11/2012

OTHER PUBLICATIONS

Shin et al., "User-Centric Conflict Management for Media Services Using Personal Companions," ETRI Journal, vol. 29, No. 3, document published Jun. 2007, pp. 311-321.
Haya et al., A Mechanism for Solving conflict in Ambient Intelligent Environments, retrieved from http://amilab.ii.uam.es/data/media/doc/haya06mechanism.pdf, 13 pages.
Carreira et al., "Towards Automatic Conflict Detection in Home and Building Automation Systems," document dated May 31, 2013, retrieved from http://web.ist.utl.pt/paulo.carreira/downloadable/papers/carreira13conflict.pdf, 25 pages.

* cited by examiner

*Primary Examiner* — Dao Ho
(74) *Attorney, Agent, or Firm* — Ditthavong & Steiner, P.C.

(57) ABSTRACT

An approach is provided for determining one or more user inputs for specifying configurable privacy-related data for at least one shared device, wherein the one or more user inputs are associated with one or more users of the at least one shared device. The approach involves processing and/or facilitating a processing of the one or more user inputs to identify at least one potential privacy conflict resulting from the one or more user inputs. The approach also involves causing, at least in part, an initiation of at least one privacy preserving action based, at least in part, on the at least one potential privacy conflict.

20 Claims, 12 Drawing Sheets

METHOD AND APPARATUS FOR PROVIDING COLLABORATIVE PRIVACY POLICIES FOR A SHARED DEVICE

BACKGROUND

In everyday life, people most likely share devices and other resources, both at home and at work. In a shared environment variety of privacy conflict situation arises because the actions taken by at least one user may affect the privacy preferences of the other users. As a result, service providers have to compare privacy preferences of multiple users of the shared device for privacy policy management as each user choices pertaining to privacy can be different. However, comparing user privacy preferences is challenging because it is difficult to determine conflicts due to the dynamicity of user choices. In addition, due to the disparities in user privacy preferences finding a resolution that reflects each user's privacy requests is an arduous task.

SOME EXAMPLE EMBODIMENTS

Therefore, there is a need for an approach for processing one or more user inputs to identify at least one potential privacy conflict, thereby causing a collaboration of one or more privacy policies for at least one privacy preserving action.

According to one embodiment, a method comprises determining one or more user inputs for specifying configurable privacy-related data for at least one shared device, wherein the one or more user inputs are associated with one or more users of the at least one shared device. The method also comprises processing and/or facilitating a processing of the one or more user inputs to identify at least one potential privacy conflict resulting from the one or more user inputs. The method further comprises causing, at least in part, an initiation of at least one privacy preserving action based, at least in part, on the at least one potential privacy conflict.

According to another embodiment, an apparatus comprises at least one processor, and at least one memory including computer program code for one or more computer programs, the at least one memory and the computer program code configured to, with the at least one processor, cause, at least in part, the apparatus to determine one or more user inputs for specifying configurable privacy-related data for at least one shared device, wherein the one or more user inputs are associated with one or more users of the at least one shared device. The apparatus is also caused to process and/or facilitate a processing of the one or more user inputs to identify at least one potential privacy conflict resulting from the one or more user inputs. The apparatus is further caused to cause, at least in part, an initiation of at least one privacy preserving action based, at least in part, on the at least one potential privacy conflict.

According to another embodiment, a computer-readable storage medium carries one or more sequences of one or more instructions which, when executed by one or more processors, cause, at least in part, an apparatus to determine one or more user inputs for specifying configurable privacy-related data for at least one shared device, wherein the one or more user inputs are associated with one or more users of the at least one shared device. The apparatus is also caused to process and/or facilitate a processing of the one or more user inputs to identify at least one potential privacy conflict resulting from the one or more user inputs. The apparatus is further caused to cause, at least in part, an initiation of at least one privacy preserving action based, at least in part, on the at least one potential privacy conflict.

According to another embodiment, an apparatus comprises means for determining one or more user inputs for specifying configurable privacy-related data for at least one shared device, wherein the one or more user inputs are associated with one or more users of the at least one shared device. The apparatus also comprises means for processing and/or facilitating a processing of the one or more user inputs to identify at least one potential privacy conflict resulting from the one or more user inputs. The apparatus further comprises means for causing, at least in part, an initiation of at least one privacy preserving action based, at least in part, on the at least one potential privacy conflict.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for processing one or more user inputs to identify at least one potential privacy conflict, thereby causing a collaboration of one or more privacy policies for at least one privacy preserving action are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
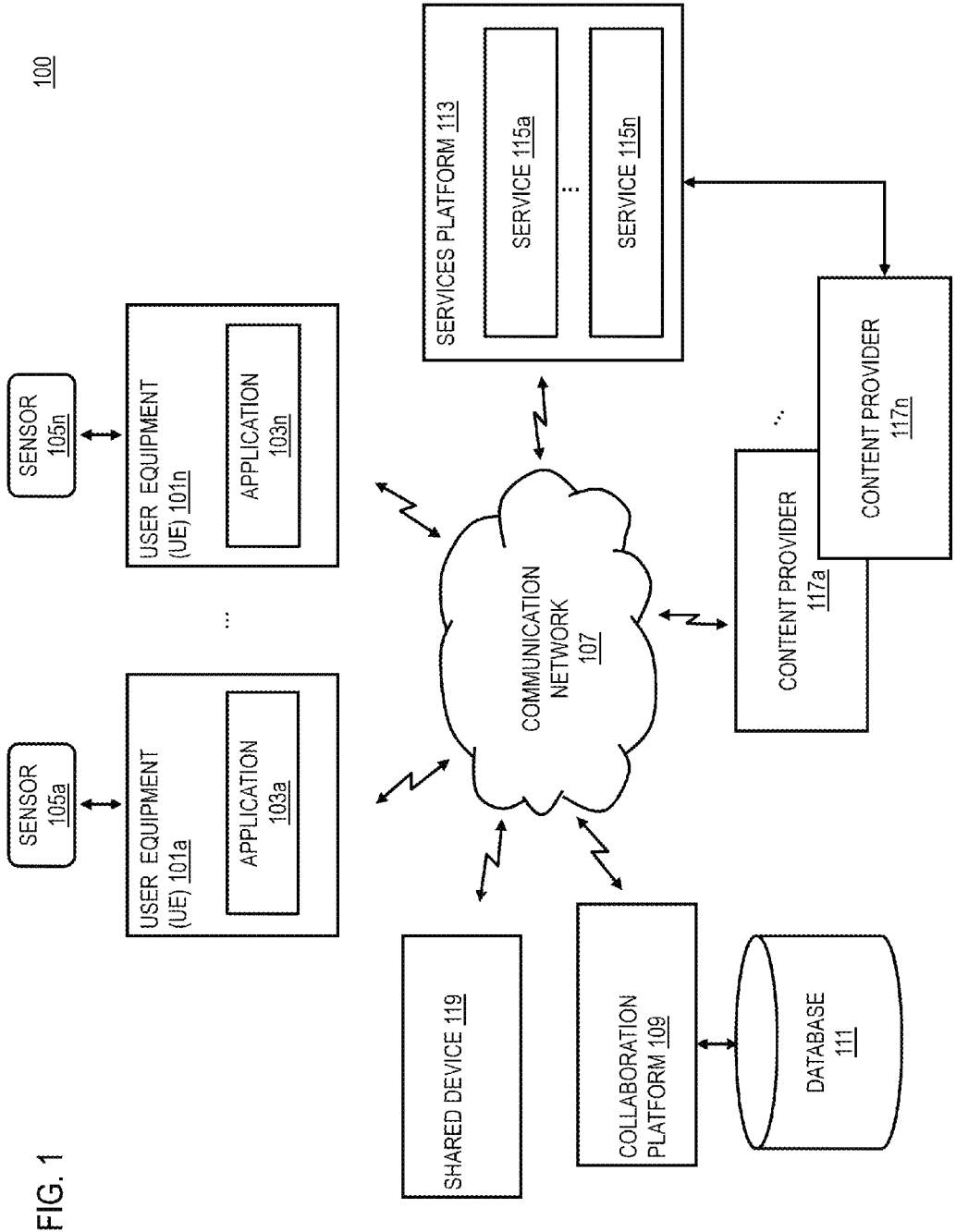
FIG. 1 is a diagram of a system capable of processing one or more user inputs to identify at least one potential privacy conflict, thereby causing a collaboration of one or more privacy policies for at least one privacy preserving action, according to one embodiment.

FIG. 1 is a diagram of a system capable of processing one or more user inputs to identify at least one potential privacy conflict, thereby causing a collaboration of one or more privacy policies for at least one privacy preserving action, according to one embodiment. Needless to mention, smart devices are becoming pervasive with different data gathering and sharing needs and capabilities. Specific numbers of such devices are shared, wherein the device is owned by multiple users and the users are responsible for regulating the operation of the shared device. Such shared devices are becoming increasingly popular in home and office building environments, for example, information and communication technologies (ICT) enabled building devices which includes traditional network devices, such as thermostats, sensors, HVAC equipment and lighting fixtures are becoming ubiquitous, leading to a complete landscape of smart devices that can be integrated into a single system. Though such shared devices benefits the users involved, at the same time the privacy of the users are compromised. At the same time, users may have their own preferences and/or restrictions with respect to regulating the usage of the at least one shared device. In one example embodiment, a neighbor's privacy restriction may contradict how the other neighbor wants the security cameras in a residential building to function. The conflict with one's neighbor does not necessarily mean that a security camera cannot be used all, but the neighbor's opposing view needs to be taken into account as this is a shared resource. As a result, a sophisticated approach is required wherein the viewing range for the security camera can be better controlled based, at least in part, on user inputs. Therefore, the objective is to come up with a compromise that best suits the preferences and/or restrictions of the concerned users.

To address this problem, a system 100 of FIG. 1 introduces the capability to a collaborate one or more privacy policies for at least one shared device to generate at least one privacy preserving action based, at least in part, on one or more identified potential conflict. The one or more potential conflict is identified based, at least in part, on the matching of one or more user inputs. In one embodiment, the system 100 causes an enforcement of one or more collaborative conflict resolving actions for at least one shared device based, at least in part, on privacy policies. The one or more collaborative conflict resolving actions is based, at least in part, on device capabilities, application trustworthiness, or a combination thereof. In another embodiment, the system 100 determines at least one permitted value for one or more configurable privacy-related data of at least one shared device, and causes a selection of at least one permitted value based, at least in part, on privacy policies, user context information, or a combination thereof. In a further embodiment, the system 100 determines the trustworthiness of at least one user associated with the at least one shared device, and causes an application of secure multiparty techniques to perform computation of one or more privacy preserving actions.

The system 100 considers privacy policy conflicts among one or more users of at least one shared device, wherein system 100 facilitates automated definition of collaborative privacy policies and generation of privacy preserving actions for at least one shared device. In one embodiment, the computation can be performed by the user's personal device, with possible negotiation between the user's personal device and the shared device. The steps include the at least one user's personal device (a) gathering inputs from the relevant users, (b) identifying any potential conflicts by comparing the gathered information, (c) deriving alternative (conflict resolution) actions that satisfies the requests of majority of users both statically and at run-time, and (d) maintaining the defined polices as the users and the shared devices evolve over time.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the applications 103 may be any type of application that is executable at the UE 101, such as, media applications (e.g., music and/or video streaming, photo exchange, etc.), social networking applications, content provisioning services, location-based services (e.g., providing proximity information), an internet browser, and the like. In another embodiment, the applications 103 may serve as the means by which the UE 101 the collaboration platform 109, and the shared device 119 interact. For example, the applications 103 may activate upon user request or upon prompting from the collaboration platform 109 that a collaboration of one or more privacy policies for at least one shared device is required to generate at least one privacy preserving action to solve a potential conflict.

By way of example, the sensors 105 may be any type of sensors. In certain embodiments, the sensors 105 may include, for example, a global positioning sensor for gathering location data, a network detection sensor for detecting wireless signals or network data, a camera/imaging sensor for gathering image data, receivers for different short-range communications (e.g., Bluetooth, WiFi, etc.) and the like. In one embodiment, the sensors 105 may determine the current device context and may correlate the contextual information for verification of the sensitivity level for the one or more data associated with the at least one shared device.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the collaboration platform 109 may be a platform with multiple interconnected components. The collaboration platform 109 may include multiple servers, intelligent networking devices, computing devices, components and corresponding software for processing one or more user inputs to identify at least one potential privacy conflict, thereby causing a collaboration of one or more privacy policies for at least one privacy preserving action. In one embodiment, the collaboration platform 109 determines one or more user inputs for specifying configurable privacy-related data for at least one shared device, wherein the one or more user inputs are associated with one or more users of the at least one shared device. In another embodiment, the collaboration platform 109 processes and/or facilitates a processing of the one or more user inputs to identify at least one potential privacy conflict resulting from the one or more user inputs. In a further embodiment, the collaboration platform 109 causes, at least in part, an initiation of at least one privacy preserving action based, at least in part, on the at least one potential privacy conflict. In one embodiment, the collaboration platform 109 focuses on the privacy issues with respect to the at least one shared device, wherein preferences and/or restrictions of all the involved users are taken into consideration. In one scenario, the privacy policies for multiple users are determined in a centralized and/or distributed manner, wherein the execution is either performed by a third party centralized server or distributed among the involved users. In another scenario, the execution occurs on the local device, as the decision is taken by a single user. Even from a privacy perspective, there are novel aspects such as protecting the inputs specified by a user, from other involved users. To summarize, the current work focuses on at least one user's UE 101 enabling privacy preserving interaction with a shared device. In one scenario, a third party centralized server (C) may be responsible for performing the distributed polices computation. There is an assumption that a third party centralized server application is installed in all UE 101, with the application installed being referred to as $C_i$. Let the users of the shared device (S) be denoted by the set $U=\{u_1, u_2, \ldots u_n\}$. In another scenario, the $C_i$ performs the following initialization tasks for at least one shared device S:

determines a set of configurable privacy parameters for at least one S, denoted as $S_P:=\{p_1, p_2, \ldots, p_m\}$ In one example embodiment, the privacy parameters for at least one shared device, for instance, a security camera in a shared building, can be with regards to its position and/or location and/or its run-time duration.

causes a creation of a webpage ($W_S$) to gather user inputs with regards to $S_P$, then customizes it for each user $u_i$, and then sends the customized $W_{Si}$ forms to the respective $C_i$ applications on the one or more UE 101s.

Subsequently, each user $u_i$ on receiving $W_{Si}$, enters his/her preferences or restrictions with respect to the configurable parameters $S_P$. Let $\{v_{1i}, v_{2i}, \ldots, v_{mi}\}$ refer to the responses provided by $u_i$, with respect to the privacy parameters $S_P:=\{p_1, p_2, \ldots, p_m\}$. Then $C_i$ returns $\{v_{1i}, v_{2i}, \ldots, v_{mi}\}$ to C. The C on receiving the user responses may stores them in its local database $S_{data}$ wherein $S_{data}$ is structured with the privacy parameters $p_i$ in $S_P$ as the columns, and rows holding the corresponding user responses. The at least one conflict between one or more user responses regarding the privacy parameters are detected by querying $S_{data}$.

| Table 1 | Table 2  | Table 3  | Table 4  |
|---------|----------|----------|----------|
| Users   | $p_1$    | $p_2$    | $p_m$    |
| $u_1$   | $v_{11}$ | $v_{21}$ | $v_{m1}$ |
| $u_2$   | $v_{12}$ | $v_{22}$ | $v_{m2}$ |
| ...     | ...      | ...      | ...      |
| $u_n$   | $v_{1n}$ | $v_{2n}$ | $v_{mn}$ |

In another example embodiment, a sample Java code to check if all the user responses matches for all parameters, is provided in the table herein below:

```
Statement stmt = con.createStatement( );
ResultSet rs = stmt.executeQuery("SELECT p1, p2, pm FROM Sdata");
int iCount = 0; //keep track of the user whose data is being processed
String p1_s, p2_s, pm_s; //temporary variables to store user responses for comparison
while (rs.next( )) {
    if (iCount == 0)
    { p1_s = rs.getString("p1"); p2_s = rs.getString("p2"); pm_s =
      rs.getString("pm");}
        else
        {
            //compare responses of the current user with those of
            previous users
            if (p1_s <> rs.getString("p1") || p2_s <>
    rs.getString("p2") || pm_s <> rs.getString("pm"))
            { System.out.println("Conflict detected"); break; }
        }
}
```

In case a conflict (mismatch) is detected, further queries refined with respect to the specific columns can be used to determine the subset of user's whose responses conflicts with the one or more privacy parameters. The next step for C is to determine resolutions to overcome the conflicts. In one scenario, for a conflict between three users, let their inputs with regards to parameter $P_2$ be $[V_{21}, V_{22}, V_{23}]$. Further, different resolution heuristics can be applied, for instance, a proposal based on 'majority satisfaction' might be that if $V_{21}=V_{22}=V$, but $V_{23}$ is different, then suggest the at least one user $U_3$ to also accept the "majority" accepted value, i.e. modify $V_{23}$ to V. In another scenario, this can be achieved by sending a modified web page $W'_{S3}$ to $C_3$, mentioning the user entered responses for different privacy parameters, and their proposed response values (if there is a conflict). In one example embodiment, a sample $W'_{S3}$ for user $U_3$ is illustrated below:

User $U_3$. Privacy input form for device S

| Table 1    | Table 2        | Table 3             |
|------------|----------------|---------------------|
| Parameters | User responses | Suggested responses |
| $P_1$      | $V_{13}$       | Accepted            |
| $P_2$      | $V_{23}$       | Modified to "V"     |
| $P_3$      | $V_{33}$       | Accepted            |

The above referenced process might need to be iterated a numbers of times between the users and C, before a consensus regarding the different privacy parameter values is reached between all users. Such is a centralized solution, where C computes the resolution, based on some heuristics, and notifies all the involved users. On the other hand, a more distributed approach can be followed where each $U_i$'s UE 101 locally computes a resolution, thereby giving preference to $U_i$'s original response, and the level to which $U_i$ is willing to compromise with respect to the variance between $U_i$'s input and those of the other users. The locally computed resolution of each user, by $U_i$'s personal device, is then notified to the other users. Alternatively, a hybrid approach can be implemented wherein the whole process is repeated until a satisfactory outcome is achieved. A few iterations can be tried before a central decision is imposed up on the users.

In one scenario, the collaboration platform 109 identifies the privacy implications for user inputs, for instance, at least one user of a shared device may not wish their responses to be known by other users of the shared device. The collaboration platform 109 then takes into account the trustworthiness of the other users of the at least one shared device. If the collaboration platform 109 is of determination that the other users are not trustable, and the sensitivity level of the user response requires it to be kept private, then the collaboration platform 109 may implement various security measures. In one scenario, the collaboration platform 109 may store one or more user responses in an encrypted form in the database $S_{data}$ (illustrated below) hosted by C. The comparison code discussed earlier needs to be adapted such that the user response comparison can be performed directly on encrypted data, without the need for C to decrypt them before comparison. The equality comparison of multi-user data can be performed in a privacy preserving fashion by algorithms based on secret sharing or homomorphic encryption.

| Table 1 | Table 2       | Table 3       | Table 4       |
|---------|---------------|---------------|---------------|
| Users   | $p_1$         | $p_2$         | $p_m$         |
| $u_1$   | $Enc(v_{11})$ | $Enc(v_{21})$ | $Enc(v_{m1})$ |
| $u_2$   | $Enc(v_{12})$ | $Enc(v_{22})$ | $Enc(v_{m2})$ |
| ...     | ...           | ...           | ...           |
| $u_n$   | $Enc(v_{1n})$ | $Enc(v_{2n})$ | $Enc(v_{mn})$ |

In the algorithm above, the collaboration platform 109 considers a static definition of privacy policies for the at least one shared device. The algorithm can be extended to real-time scenarios, where a negotiation occurs between the user's personal device and the shared device, with respect to the requirements of the shared device and privacy preferences of the user. Such an approach can be used to choose among multiple check-in options in a building or a manual check-in with the building clerk or a personal device based location check-in or a security camera based (implicit) check-in. In one example embodiment, the collaboration platform 109 determines a variant of the outlined collaborative privacy algorithm, where at the end of conflict detection and conflict resolution, multiple values are allowed for the configurable parameters of the at least one shared device. In one scenario, let the allowed values for parameter p of shared device S be $V_x$ and $V_y$. Given this, whenever user $U_i$ approaches S, i.e., enters the effective range of S, the following interaction occurs between $U_i$'s personal device $d_i$ and S:
1. $d_i$ acquires the set of permitted values, e.g. $\{V_x, V_y\}$, for each parameter p of S.
2. $d_i$ selects a value, for instance, $V_y$, based on pre-defined privacy policies and/or preferences, and possibly user context including nearby people.
3. $d_i$ communicates the selected value to S, which then processes $U_i$ (or basically his corresponding data) according to the chosen usage parameter values.
4. In an extended use-case, $d_i$ can also specify a value $V_z$ to S, which is different from the accepted ones, i.e., $V_x$ and $V_y$. Such act causes further iteration of the collaborative conflict detection/resolution algorithm.

In one embodiment, the collaboration platform 109 may include or have access to the database 111 to access or store any kind of data associated with at least one shared device 119. In another embodiment, the collaboration platform 109 may determine privacy policy information, sensitivity level for one or more data, or a combination thereof for at least one shared device 119 by comparing the one or more data with the one or more data stored in the database 111. In a further embodiment, the collaboration platform 109 may determine the relationship information, the profile information, or a combination thereof for one or more users of the at least one shared device 119 by comparing the one or more data with the one or more data stored in the database 111. Such comparison assists the collaboration platform 109 to determine at least one potential conflict. The data stored in the database 111 may, for instance, be provided by the UE 101, the services platform 113, one or more services 115*a*-115*n* (herein after services 115), one or more content providers 117*a*-117*n* (herein after content providers 117), or shared device 119.

The services platform 113 may include any type of service. By way of example, the services platform 113 may include social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the collaboration platform 109, the content providers 117, and the shared device 119 to supplement or aid in the processing of the content information. In another embodiment, the services platform 113 may provide the collaboration platform 109 with user preference information, contextual information etc., to assist the collaboration platform 109 in determining one or more privacy protecting actions for data associated with the at least one shared device 119.

By way of example, services 115 may be an online service that reflects interests and/or activities of users. In one scenario, the services 115 provide representations of each user (e.g., a profile), his/her social links, and a variety of additional information. The services 115 allow users to share activities information, contextual information, and interests within their individual networks, and provides for data portability. In one embodiment, the services 115 may further assist the collaboration platform 109 in profile mapping to protect the privacy interest of the one or more users of the at least one shared device 119. In another embodiment, the services 115 may assist the collaboration platform 109 in providing with one or more forms used for user inputs, for instance, a web page. In a further embodiment, the services 115 may additionally assist the collaboration platform 109 in determining the accessibility of the one or more data associated with the at least one shared device 119 based, at least in part, on the reliability and trustworthiness of other users of the at least one shared device 119, the sensitivity levels of one or more data, or a combination thereof. Further, user privacy profiles may be specific to each service, for example, services 115 may deduce privacy profile settings based on user settings with similar or analogous services using the same data.

The content providers 117 may provide content to the UE 101, the collaboration platform 109, the services 115 of the services platform 113, and the shared device 119. The content provided may be any type of content, such as textual content, audio content, video content, image content, etc. In one embodiment, the content providers 117 may provide content that may supplement content of the applications 103, the sensors 105, or a combination thereof. By way of example, the content providers 117 may provide content that may aid the collaboration platform 109 in determining suitable privacy preserving actions for one or more data associated with at least one shared device 119. In one embodiment, the content providers 117 may provide content that may aid the collaboration platform 109 in identifying one or more potential conflict with regards to one or more users' privacy preferences, one or more users' activities, or a combination thereof. In another embodiment, the content providers 117 may also store content associated with the UE 101, the collaboration platform 109, and the services 115 of the services platform 113. In a further embodiment, the content providers 117 may manage access to a central repository of data, and offer a consistent, standard interface to user's data.

By way of example, the shared device 119 is the device owned by multiple users, wherein the users shares the ownership and responsibility in regulating the operation of the at least one shared device 119. In one example embodiment, the at least one shared device 119 may be a security camera in a residential building whereby the residents of the building are the users sharing the ownership and the functioning of the security camera. The one or more users may regulate the functioning of the security camera via their respective UE 101. In one scenario, the one or more users may access one or more forms for specifying the configurable privacy-related data via their respective UE 101, wherein one or more forms includes a web page. The one or more users may provide inputs for specifying configurable privacy-related data for the security camera. Subsequently, the collaboration platform 109 may determine one or more privacy policies based, at least in part, on the user inputs. Consequently, the security camera may operate based, at least in part, on the determined privacy policies.

By way of example, the UE 101, the collaboration platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
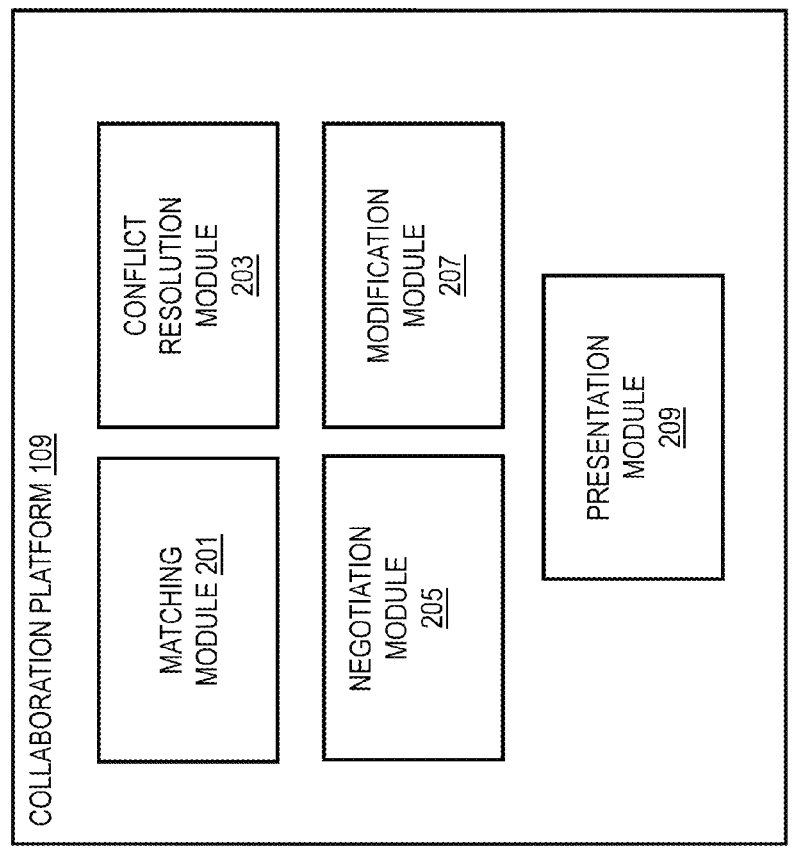
FIG. 2 is a diagram of the components of the collaboration platform 109, according to one embodiment.

FIG. 2 is a diagram of the components of the collaboration platform 109, according to one embodiment. By way of example, the collaboration platform 109 includes one or more components for processing one or more user inputs to identify at least one potential privacy conflict, thereby causing a collaboration of one or more privacy policies for at least one privacy preserving action. It is contemplated that the functions of these components may be combined in one or more components or performed by other components of equivalent functionality. In this embodiment, the collaboration platform 109 includes a matching module 201, a conflict resolution module 203, a negotiation module 205, a modification module 207 and a presentation module 209.

In one embodiment, the matching module 201 causes a matching of one or more user inputs to determine at least one potential conflict. The at least one user input may specify one or more configurable privacy-related data for the at least one shared device 119. The one or more configurable privacy-related data includes device capability information and/or activity information and/or contextual information and/or location information. In another embodiment, the matching module 201 may determine user preferences with respect to the configurable privacy-related data and may check if all the user responses match. A conflict occurs when there exist one or more users whose inputs with respect to at least one parameter do not match. The matching module 201 may match such information in real-time, periodically, based on a pre-determined schedule, based on demands from one or more users or a combination thereof. In a further scenario, the matching module 201 may perform the conflict detection among the user inputs in a centralized, distributed or a hybrid manner.

In one embodiment, the conflict resolution module 203 may determine one or more conflict resolution actions to overcome the conflicts detected by the matching module 201. In one embodiment, the conflict resolution module 203 may determine at least one action that satisfies the requests of the majority of the users associated with the at least one shared device 119. In another embodiment, the conflict resolution module 203 may determine the identity information and/or reputation information of the at least one other user to determine their trustworthiness. In one scenario, the conflict resolution module 203 may prevent potential conflicts related to privacy of user inputs by implementing security measures to prevent user responses from being accessed by untrusted users, for instance, encrypting the user responses. In a further embodiment, the conflict resolution module 203 may cause a repetition of the conflict detection process and/or conflict resolution process based on the modification of one or more privacy policies for at least one shared device 119. The one or more privacy policies for at least one shared device 119 may be modified upon changes on the status of the at least one user associated with at least one shared device 119.

In one embodiment, the negotiation module 205 causes a negotiation between at least one device and at least one shared device 119 with respect to the requirements of the shared device 119 and the privacy preferences of the user. The negotiation module 205 causes a compromise between at least one user input and at least one other user input by further causing a rational collaborative decisions with respect to the usage of the at least one shared device 119. In another embodiment, the negotiation module 205 causes negotiation of privacy alternatives with the shared device 119 to reach a balance between the requirements of the shared device 119 and privacy preferences of the users. In a further scenario, the negotiation module 205 causes an application of one or more conflict resolution strategies for determining one or more privacy policies for at least one shared device 119 based, at least in part, on the negotiation.

In one embodiment, the modification module 207 maintains the defined policies as the users and/or the at least one shared device 119 evolve over time. In one embodiment, the modification module 207 monitors any changes in the device configurable parameters. In another embodiment, the modification module 207 observes the departures or additions of one or more users associated with the at least one shared device 119. The modification module 207 may determine the need to repeat the conflict detection process and/or the conflict resolution process based, at least in part, on the monitoring. In one scenario, one or more users associated with the at least one shared device 119 may not use the device anymore, whereby the user inputs and/or user preferences of the departing users are no longer valid. In another scenario, the modification module 207 recognizes the inputs and preferences of new users. In such manner, the modification module 207 implements a more feasible and agreeable policies for the remaining users. In a further embodiment, the modification module 207 repeats the conflict detection process and/or the conflict resolution process upon determination of an unsatisfactory outcome. In one scenario, such process of defining policies for the at least one shared device by repeating the conflict detection and/or conflict resolution mechanism may also involve a method wherein the history in terms of previous user preferences, previous user choices, any compromises made in the past by the user, etc., may be presented to the user. Thereby, allowing the users to make more informed policy choices in the future.

In one embodiment, the presentation module 209 may cause a presentation of one or more data in the most suitable manner from among the plurality of configurable privacy-related data based, at least in part, on user interaction, privacy policy, or a combination thereof. In another embodiment, the presentation module 211 may generate one or more presentations for different data types based on their sensitivity levels, the trustworthiness of other users, or a combination thereof. In a further embodiment, the presentation module 209 causes, at least in part, a presentation of one or more notification messages at the one or more devices associated with the at least one shared device 119 based, at least in part, on the conflict resolution strategies. The presentation module 209 may work in conjunction with the matching module 201, the conflict resolution module 203, the negotiation module 205, and the modification module 207 to gather information on user preferences, privacy policies, or a combination thereof.

The above presented modules and components of the collaboration platform 109 can be implemented in hardware, firmware, software, or a combination thereof. Though depicted as a separate entity in FIG. 1, it is contemplated that the collaboration platform 109 may be implemented for direct operation by respective UE 101. As such, the collaboration platform 109 may generate direct signal inputs by way of the operating system of the UE 101 for interacting with the applications 103. In another embodiment, one or more of the modules 201-209 may be implemented for operation by respective UEs, as a collaboration platform 109, or combination thereof. Still further, the collaboration platform 109 may be integrated for direct operation with services 115, such as in the form of a widget or applet, in accordance with an information and/or subscriber sharing arrangement. The various executions presented herein contemplate any and all arrangements and models.

Figure 3:
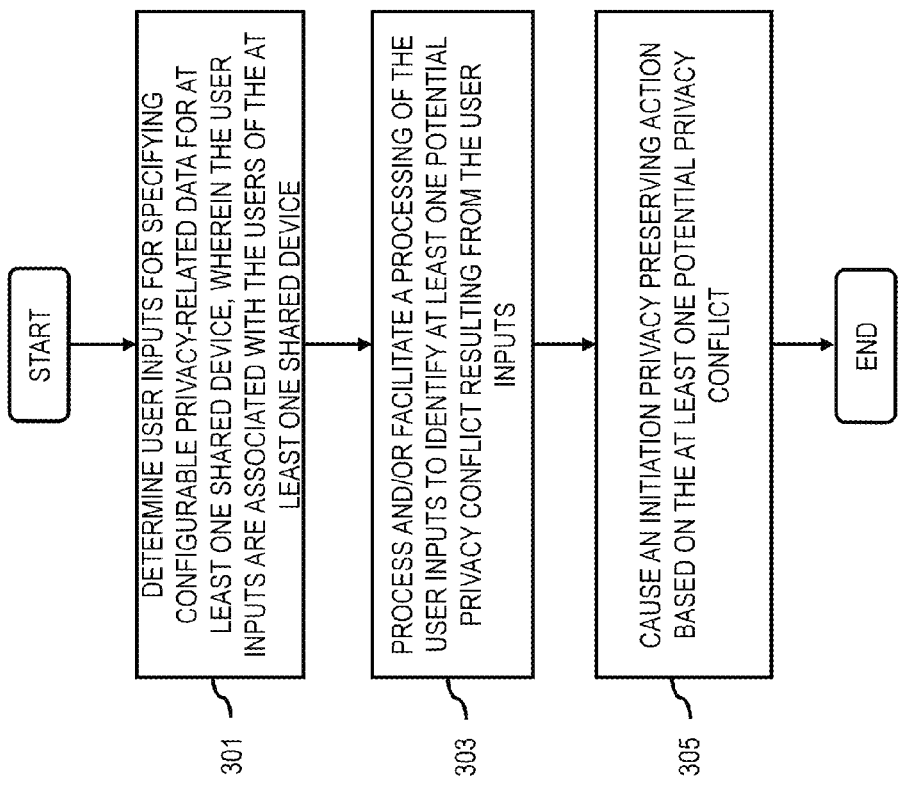
FIG. 3 is a flowchart of a process for processing and/or facilitating a processing of the one or more user inputs to identify at least one potential privacy conflict to initiate at least one privacy preserving action, according to one embodiment.
Figure 11:
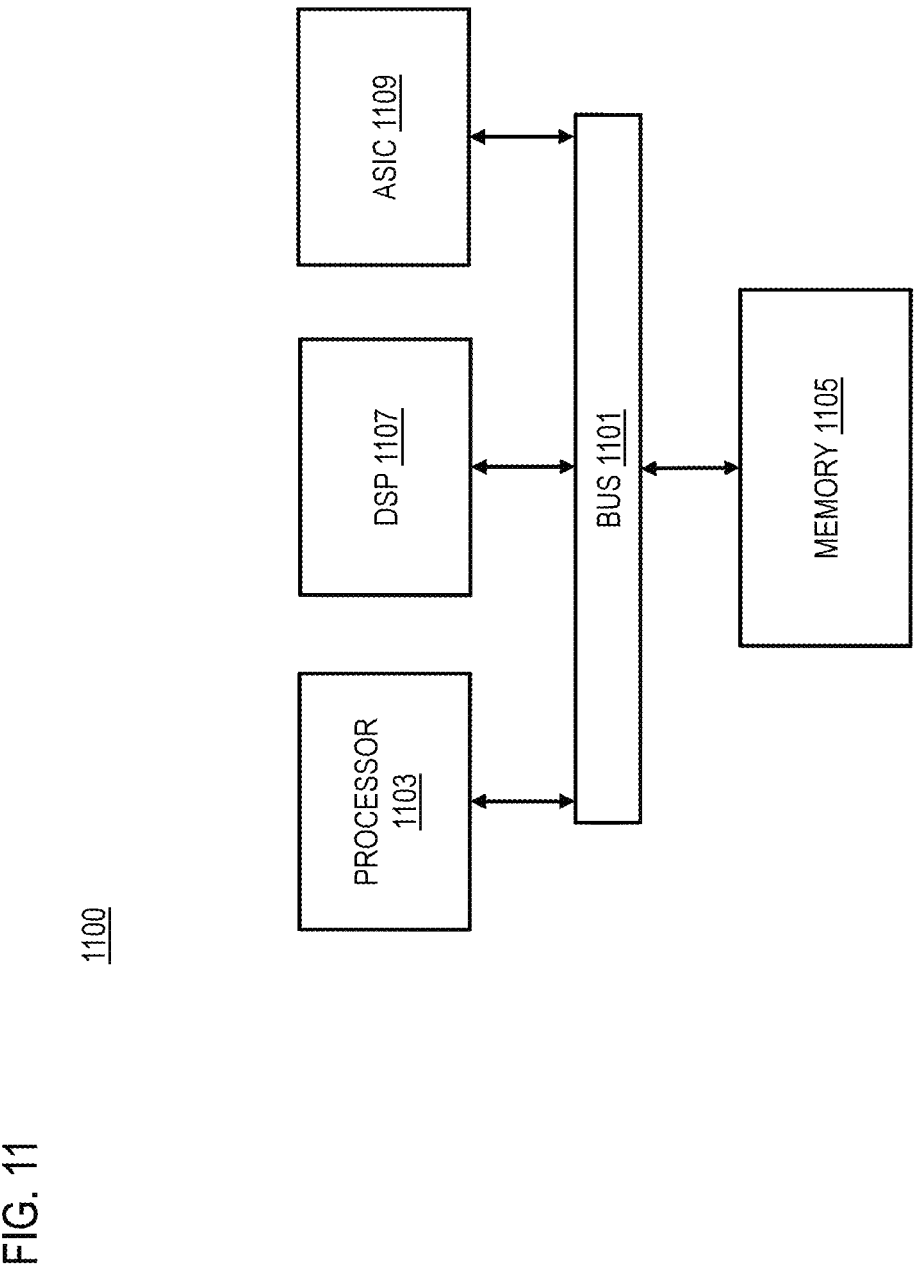
FIG. 11 is a diagram of a chip set that can be used to implement an embodiment of the invention.

FIG. 3 is a flowchart of a process for processing and/or facilitating a processing of the one or more user inputs to identify at least one potential privacy conflict to initiate at least one privacy preserving action, according to one embodiment. In one embodiment, the collaboration platform 109 performs the process 300 and is implemented in, for instance, a chip set including a processor and a memory as shown in FIG. 11.

In step 301, the collaboration platform 109 determines one or more user inputs for specifying configurable privacy-related data for at least one shared device, wherein the one or more user inputs are associated with one or more users of the at least one shared device. In one embodiment, the one or more configurable privacy-related data includes location information, temporal information, run-time duration information, functional attributes information, or a combination thereof. In one example embodiment, the collaboration platform 109 receives one or more user inputs for specifying one or more configurable privacy-related data for at least one shared device. Subsequently, the collaboration platform 109 causes a matching of one or more user inputs to determine at least one potential conflict. Then, the collaboration platform 109 causes a collaboration of one or more privacy policies for at least one shared device to generate at least one privacy preserving action. In such manner, the collaboration platform 109 defines privacy policies for regulating the usage of a shared device by a group of users. In one embodiment, the collaboration platform 109 may keep track of the conflicts and/or negotiations performed by the at least one user associated with the at least one shared device. The collaboration platform 109 may monitor one or more user choices with regards to different privacy parameters, and may use the information to adapt policies as the prevailing conditions evolve. In one scenario, one or more users associated with the at least one shared device may be presented with their previous choices and/or preferences and/or compromises. Such presentation of past activities to respective users may be indicated during user inputs, thereby shaping a more reliable policies for the at least one shared device.

In step 303, the collaboration platform 109 processes and/or facilitates a processing of the one or more user inputs to identify at least one potential privacy conflict resulting from the one or more user inputs. In one embodiment, the one or more user inputs includes privacy preference information, activity information, contextual information, restriction information, or a combination thereof. In another embodiment, the identification of at least one potential privacy conflict is based, at least in part, on a heuristic iteration, time-based operation, device capability to support user inputs, or a combination thereof. In a further embodiment, the collaboration platform 109 may determine trustworthiness of at least one user associated with at least one shared device, thereby causing an application of secure multiparty techniques to perform computation of one or more privacy preserving actions.

In step 305, the collaboration platform 109 causes, at least in part, an initiation of at least one privacy preserving action based, at least in part, on the at least one potential privacy conflict. In one embodiment, the collaboration platform 109 determines at least one permitted value for one or more configurable privacy-related data of the at least one shared device. Then, the collaboration platform 109 causes a selection of at least one permitted value based, at least in part, on privacy policies, user context information, or a combination thereof. In another embodiment, the collaboration platform 109 causes an enforcement of collaborative conflict detection actions for at least one shared device based, at least in part, on privacy policy, wherein one or more collaborative conflict detection actions is based, at least in part, on device capabilities, application trustworthiness, or a combination thereof. In such manner, the collaboration platform 109 resolves the conflicts between privacy preferences of the involved users in the group with regards to usage of the at least one shared device. In one example embodiment, once the collaboration platform 109 completes the conflict detection and/or conflict resolution process, the collaboration platform 109 may keep track of the functioning of the at least one shared device (e.g. security camera) based, at least in part, on its current privacy settings, and its impact on one or more users associated with the at least one shared device. For example, the at least one user associated with the at least one shared device may propose a privacy constraint that prevents the shared security camera from running during a specific period of the day. Later, during the actual usage of the at least one shared device, the collaboration platform 109 may realize that the privacy setting requested by the at least one user hardly affects the user. The collaboration platform 109 may come to such realization based, at least in part, on the activity information of the at least one user, for example, entry or exit by at least one user in the building that is recorded by the shared security camera and/or his/her UE 101. In an extended scenario, the corresponding application installed in the UE 101 may notify and/or recommend the at least one user that a particular restrictive policy may be relaxed. As a result, the UE 101 may act as an accessory (collaborating) device monitoring the user's interaction with the at least one shared device (and its current policy settings), thereby providing policy change recommendations to the user based on his/her interaction history. Such a policy change recommendation, if accepted by the user, can also be considered as a trigger leading to another iteration of the privacy policy conflict detection and/or conflict resolution process (if required).

Figure 4:
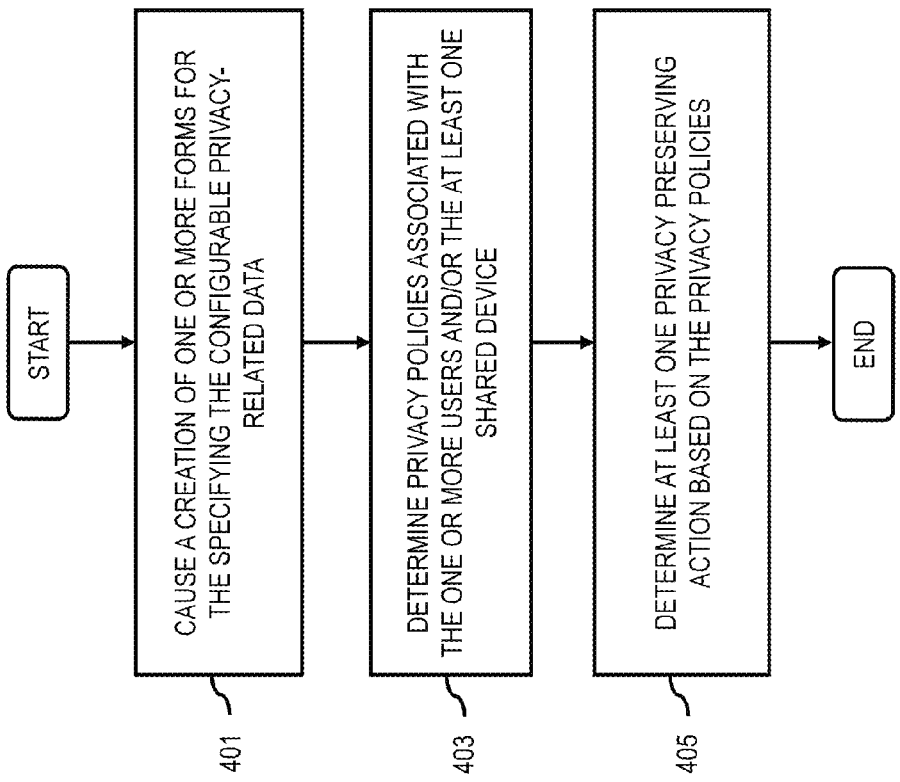
FIG. 4 is a flowchart of a process for causing a creation of one or more forms for specifying configurable privacy-related data, and determining at least one privacy preserving action based on the one or more determined privacy policies, according to one embodiment.

FIG. 4 is a flowchart of a process for causing a creation of one or more forms for specifying configurable privacy-related data, and determining at least one privacy preserving action based on the one or more determined privacy policies, according to one embodiment. In one embodiment, the collaboration platform 109 performs the process 400 and is implemented in, for instance, a chip set including a processor and a memory as shown in FIG. 11.

In step 401, the collaboration platform 109 causes, at least in part, a creation of one or more forms for specifying the configurable privacy-related data, wherein the one or more user inputs are determined using the one or more forms. In one embodiment, the one or more forms includes a web page based, at least in part, on the configurable privacy-related data, privacy policies, or a combination thereof. In one example embodiment, the collaboration platform 109 creates a webpage to gather one or more user inputs with regards to the configurable privacy parameters, for instance, when the collaboration platform 109 determines conflicts based on user inputs, the collaboration platform 109 sends a modified web page mentioning the user entered responses for different privacy parameters, and their suggested response values. In another embodiment, the collaboration platform 109 may receive a request data from at least one UE 101 of the user associated with the at least one shared device, wherein the request data is arranged according to the created form.

In step 403, the collaboration platform 109 determines one or more privacy policies associated with the one or more users, the at least one shared device, or a combination thereof. In one embodiment, the collaboration platform 109 may determine one or more privacy policies for at least one shared device based, at least in part, on the contextual information of the UE 101 of one or more users associated with the at least one shared device, one or more user inputs, or a combination thereof. In another embodiment, the collaboration platform 109 may cause a comparison between the user inputs and the capability information of the at least one shared device to determine one or more privacy policies.

In step 405, the collaboration platform 109 determines the at least one privacy preserving action based, at least in part, on the one or more privacy policies. In one embodiment, the collaboration platform 109 generates one or more privacy preserving actions based on the collaborative privacy policies. In another embodiment, the collaboration platform 109 implements one or more privacy preserving actions based, at least in part, on pre-defined privacy policies, user preferences, user context including nearby people, or a combination thereof.

Figure 5:
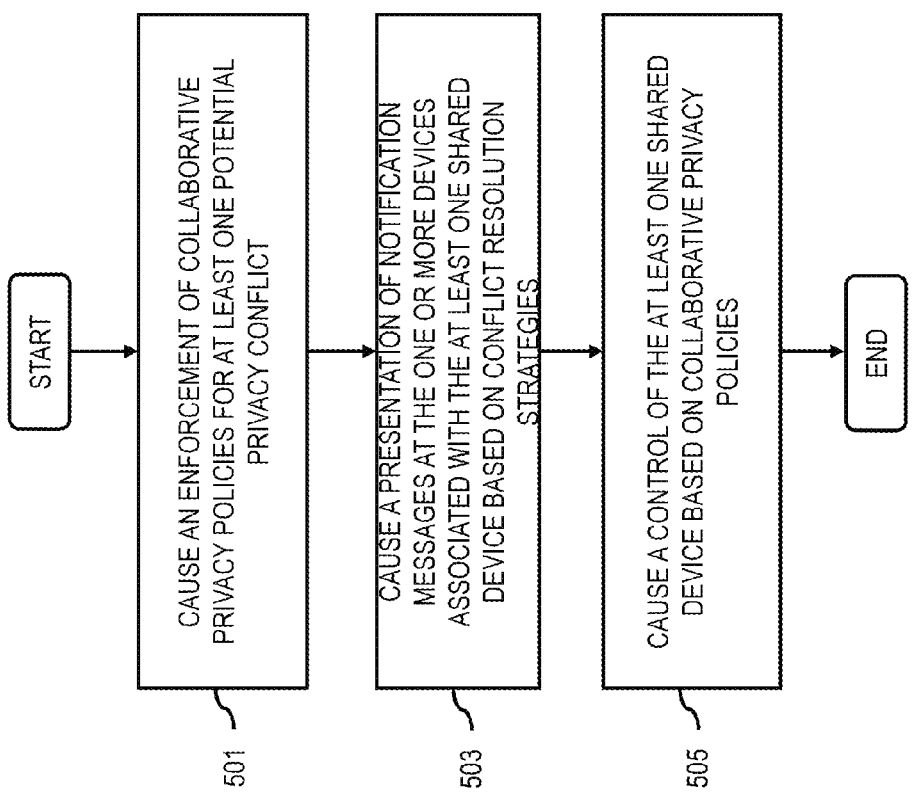
FIG. 5 is a flowchart of a process for causing an enforcement of collaborative privacy policies for at least one potential privacy conflict and cause a control of the at least one shared device based on collaborative privacy policies, according to one embodiment.

FIG. 5 is a flowchart of a process for causing an enforcement of collaborative privacy policies for at least one potential privacy conflict and cause a control of the at least one shared device based on collaborative privacy policies, according to one embodiment. In one embodiment, the collaboration platform 109 performs the process 500 and is implemented in, for instance, a chip set including a processor and a memory as shown in FIG. 11.

In step 501, the collaboration platform 109 causes, at least in part, an enforcement of collaborative privacy policies for at least one potential privacy conflict. In one embodiment, the collaboration platform 109 upon determining one or more conflicts between the users of the at least shared device may collaborate one or more privacy policies for conflict resolution. In one example embodiment, user A and user B wants the security camera at the front and the back entrance to run during the night whereas user C wants the security camera at the front entrance to run throughout the day till the evening, the collaboration platform 109 detects the conflict and attempts resolution by proposing a collaborative privacy policy to run the security camera at the front entrance from the evening throughout the night. In such manner, the collaborative privacy policy considers the preferences of all the users associated with the at least one shared device.

In step 503, the collaboration platform 109 causes, at least in part, a presentation of one or more notification messages at the one or more devices associated with the at least one shared device based, at least in part, on conflict resolution strategies. In one example embodiment, the collaboration platform 109 may identify at least one conflict by comparing a subset of the configurable privacy-related data. The collaboration platform 109 may undertake conflict resolution strategies, wherein the resolution is performed based on a requirement, for instance, major quantity, least common multiple (1 cm), or greatest common factor (GCD). Subsequently, the collaboration platform 109 may trigger a recommendation based on the determined conflict and may notify the respective users of the recommendation for controlling the at least one shared device.

In step 505, the collaboration platform 109 causes, at least in part, a control of the at least one shared device based, at least in part, on collaborative privacy policies. In one embodiment, the collaboration platform 109 causes the at least one shared device to perform one or more privacy preserving actions based, at least in part, on the generated recommendations. In another embodiment, the collaboration platform 109 may implement conflict resolution actions for at least one shared device by identifying potential conflicts from relevant users and then fulfill the request of the majority of the users both statically and at run-time.

Figure 6:
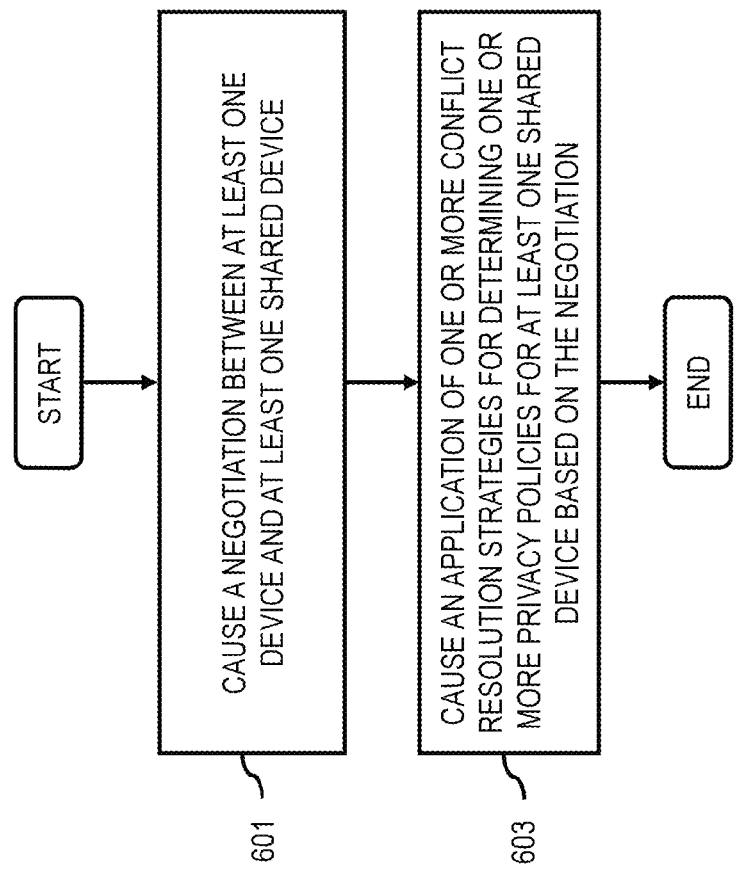
FIG. 6 is a flowchart of a process for causing an application of one or more conflict resolution strategies for determining one or more privacy policies based on the negotiation between at least one device and at least one shared device, according to one embodiment.

FIG. 6 is a flowchart of a process for causing an application of one or more conflict resolution strategies for determining one or more privacy policies based on the negotiation between at least one device and at least one shared device, according to one embodiment. In one embodiment, the collaboration platform 109 performs the process 600 and is implemented in, for instance, a chip set including a processor and a memory as shown in FIG. 11.

In step 601, the collaboration platform 109 causes, at least in part, a negotiation between at least one device and at least one shared device. In one embodiment, the collaboration platform 109 causes a compromise between at least one user input, at least one other user input, or a combination thereof. In one example embodiment, the collaboration platform 109 causes a negotiation between the user's UE 101 and the at least one shared device, with respect to the requirements of the shared device and privacy preferences of the user. Such negotiation allows a compromise on privacy alternatives, thereby reaching a balance between the requirements of the shared device and privacy preferences of the user.

In step 603, the collaboration platform 109 causes, at least in part, an application of one or more conflict resolution strategies for determining one or more privacy policies for at least one shared device based, at least in part, on the negotiation. In one embodiment, the fixing of the at least one conflict is based, at least in part, on a determination that majority users have reached at least one consensus threshold value with respect to the at least one conflict. In one example embodiment, the collaboration platform 109 determines at least one conflict resolution strategy with respect to the one or more polling elements, for instance, by taking into consideration privacy preferences of majority of the users.

Figure 7:
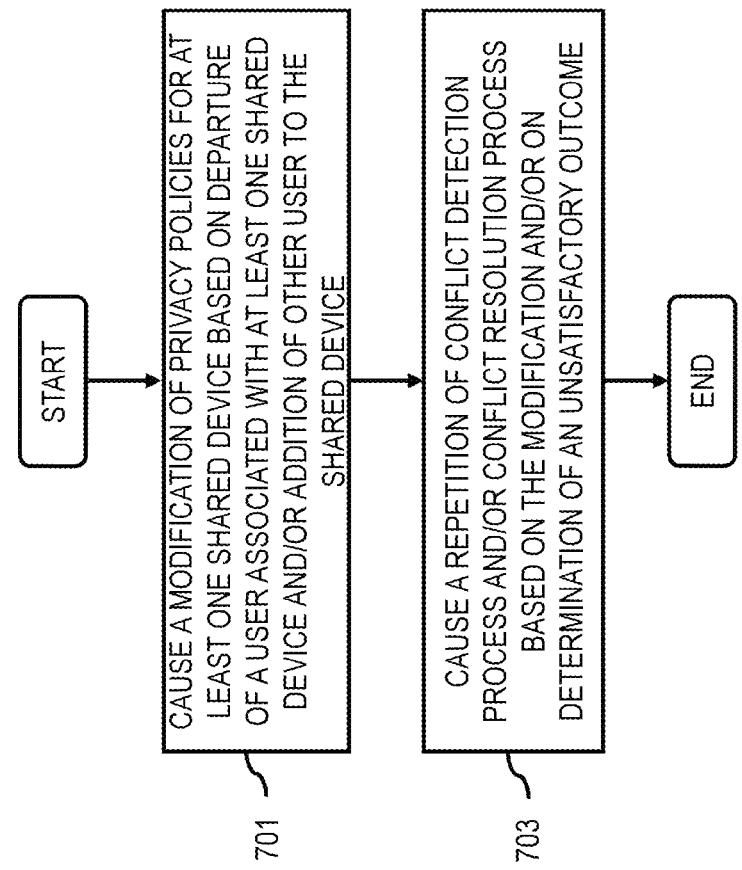
FIG. 7 is a flowchart of a process for modification of one or more privacy policies for at least one shared device and a repetition of conflict detection process and/or conflict resolution process based, at least in part, on the modification and/or on determination of an unsatisfactory outcome, according to one embodiment.

FIG. 7 is a flowchart of a process for modification of one or more privacy policies for at least one shared device and a repetition of conflict detection process and/or conflict resolution process based, at least in part, on the modification and/or on determination of an unsatisfactory outcome, according to one embodiment. In one embodiment, the collaboration platform 109 performs the process 700 and is implemented in, for instance, a chip set including a processor and a memory as shown in FIG. 11.

In step 701, the collaboration platform 109 causes, at least in part, a modification of one or more privacy policies for at least one shared device based, at least in part, on departure of at least one user associated with at least one shared device, addition of at least one other user to the shared device, or a combination thereof. In one embodiment, the collaboration platform 109 keeps track of the modifications in the configurable parameters for the at least one shared device. In another embodiment, the collaboration platform 109 may monitor the one or more users leaving and/or one or more new users entering the shared system. In such manner, the collaboration platform 109 may modify the privacy policies, thereby acknowledging that the preferences and/or inputs of the at least one user is no longer valid upon his/her departure from the shared system.

In step 703, the collaboration platform 109 causes, at least in part, a repetition of conflict detection process, conflict resolution process, or a combination thereof based, at least in part, on the modification, on determination of an unsatisfactory outcome, or a combination thereof. In one example embodiment, the collaboration platform 109 may repeat the process of conflict detection upon determination that one or more privacy policies need modification. Thereafter, the collaboration platform 109 may implement a different conflict resolution mechanics that is more agreeable to the remaining users than the current resolution.

Figure 8:
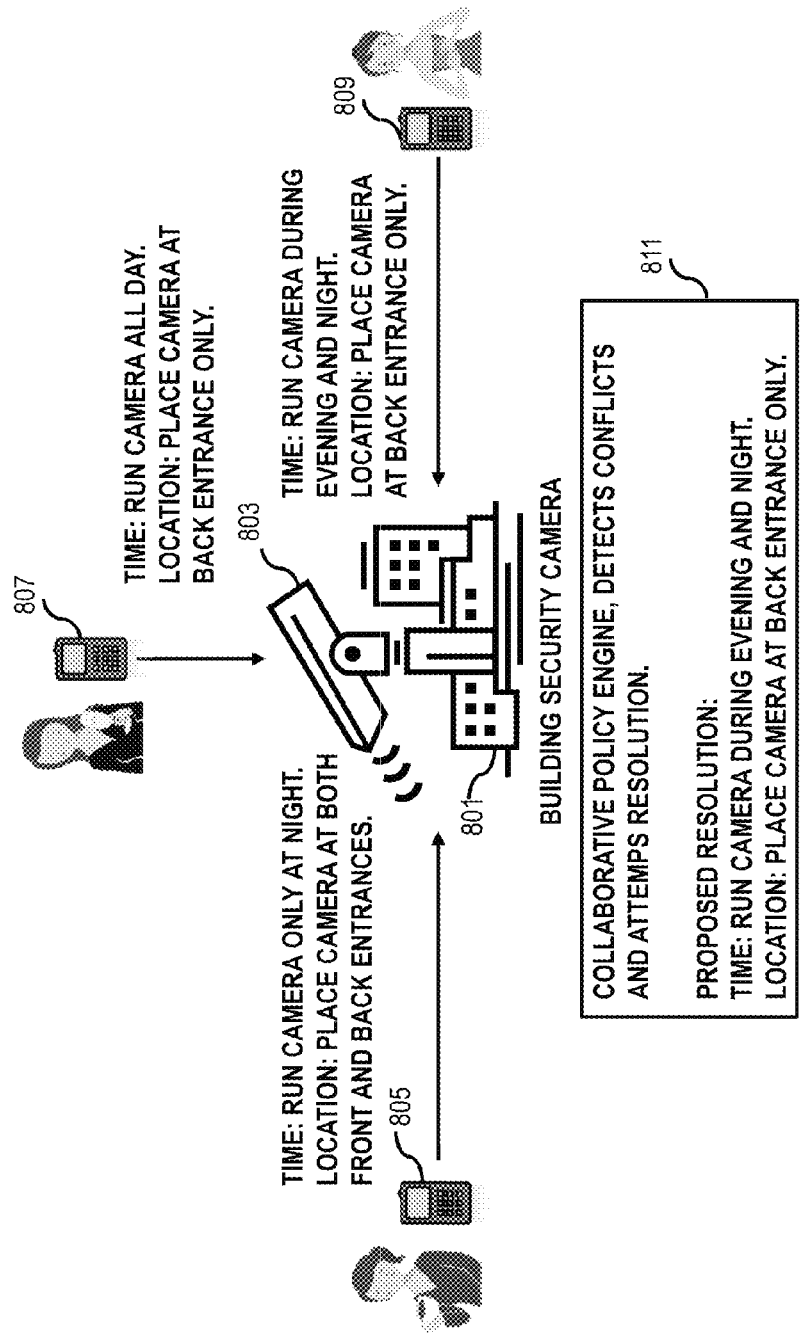
FIG. 8 is a user interface diagram that represents a collaborative privacy policy for a security camera in a residential building, according to one example embodiment.

FIG. 8 is a user interface diagram that represents a collaborative privacy policy for a security camera in a residential building, according to one example embodiment. In one scenario, the security camera can be considered as a shared device with multiple users, wherein the multiple users shares the ownership and maintenance cost, for example, the cost of purchasing and running the security camera infrastructure is shared between the multiple users of the security camera. In one scenario, a shared security camera records movement of the residents and provides safety to the residents of the building. In another scenario, at least one neighbor's privacy restriction may contradict how another neighbor wants the security camera to function. The opposing views of the neighbor's needs to be taken into account during the operation of the shared security camera, therefore there is a need to define privacy policies for individual users. The conflict between multiple users does not necessarily mean that a security camera cannot be used at all, but a more sophisticated approach is required wherein the security camera can be controlled as per the requirements of the multiple users. The objective is to come up with a compromise that best suits the preferences and/or restrictions of the concerned users. In one example embodiment, a building XYZ [801] has a security camera [803] shared by multiple users. The collaboration platform 109 may observe conflicts between one or more users in terms of their privacy preferences, for instance, user A [805] wants the security cameras [803] at the front and the back entrance to run only at night, on the other hand, user B [807] wants the security camera [803] at the back entrance to run only during the day, conversely user C [809] wants the security camera [803] located at the back entrance to run during the evening all through the night. Subsequently, the collaboration platform 109 may implement several conflict resolution tactics to satisfy the wishes of majority of users [811]. The collaboration platform 109 may determine that user A [805] and user C [809] wants the security camera [803] to run during the night, and all the users A [805], B [807], and C [809] wants the security camera [803] at the back entrance to be activated. As a result, the collaboration platform 109 may determine to run the security camera [803] at the back entrance in the evening and the night. In one scenario, the collaboration platform 109 may implement conflict resolution actions that satisfies the wishes of majority of users, and may accept the suggestions proposed by majority of users. Here, the action undertaken by the collaboration platform 109 acknowledges the inputs of all three users thereby leading to one or more compromises, for instance, user A [805] compromises the activation of the security camera [803] at the front entrance, user B [807] compromises activation of the security camera [803] during the day, whereas user C [809] benefits by not compromising.

Figure 9:
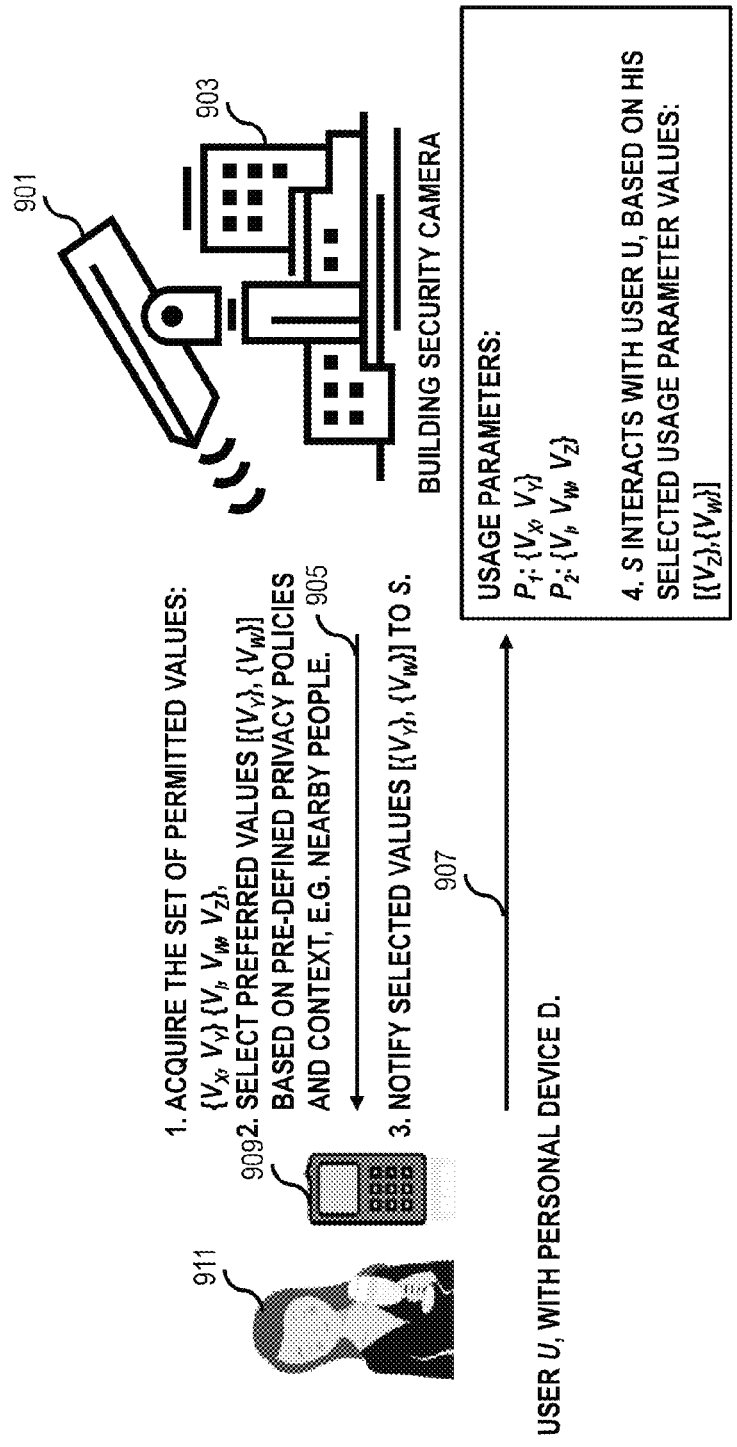
FIG. 9 is a user interface diagram that represents a real time architecture involving personal shared device interaction and/or device negotiation, according to one example embodiment.

FIG. 9 is a user interface diagram that represents a real time architecture involving personal shared device interaction and/or device negotiation, according to one example embodiment. The intuition is that a usage parameter of a shared device, for instance, the position of a security camera [901], the location of a security camera [903], or its run-time duration, has different implications for different occupants of a building. In one scenario, the collaboration platform 109 may define privacy policies regarding the usage of the at least one shared device [905]. The collaboration platform 109 takes into consideration the position of the one or more user's apartments in the building [903] and their movement patterns with respect to when and how many times they enter and leave the building. In another scenario, the collaboration platform 109 may denote configurable parameters with respect to usage of a shared device [907], and may further denote a set of permitted values $\{v_i, v_y\}, \{v_l, v_w, v_z\}$ for the configurable parameters.

All the involved users have a collaborative privacy policies application installed on their respective UE 101 [909] that acquires a set of permitted values for each parameters, through which user A [911] enters his/her preferred values $[\{v_y\}, \{v_w\}]$ based on the pre-defined privacy policies and the contextual information. The UE 101 [909] of user A [911] then notifies the shared device [901] about the selected values, the shared device [901] then processes the corresponding data to user A [911] according to the chosen usage parameter values. Subsequently, the shared device [901] interacts with user A's UE 101 [909] based on his/her selected usage parameter values, whereby a negotiation occurs between the UE 101 [909] and the shared device [911]. In one scenario, the negotiation may be with respect to the requirements of the shared device and privacy preferences of the user. In one scenario, the conflict detection and conflict resolution process involves allowing multiple values for the configurable parameters of the device. In a further scenario, UE 101 [909] can also specify a value different from the accepted ones to the shared device [901], thereby causing an iteration of the collaborative conflict detection and conflict resolution method.

The processes described herein for processing one or more user inputs to identify at least one potential privacy conflict, thereby causing a collaboration of one or more privacy policies for at least one privacy preserving action may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
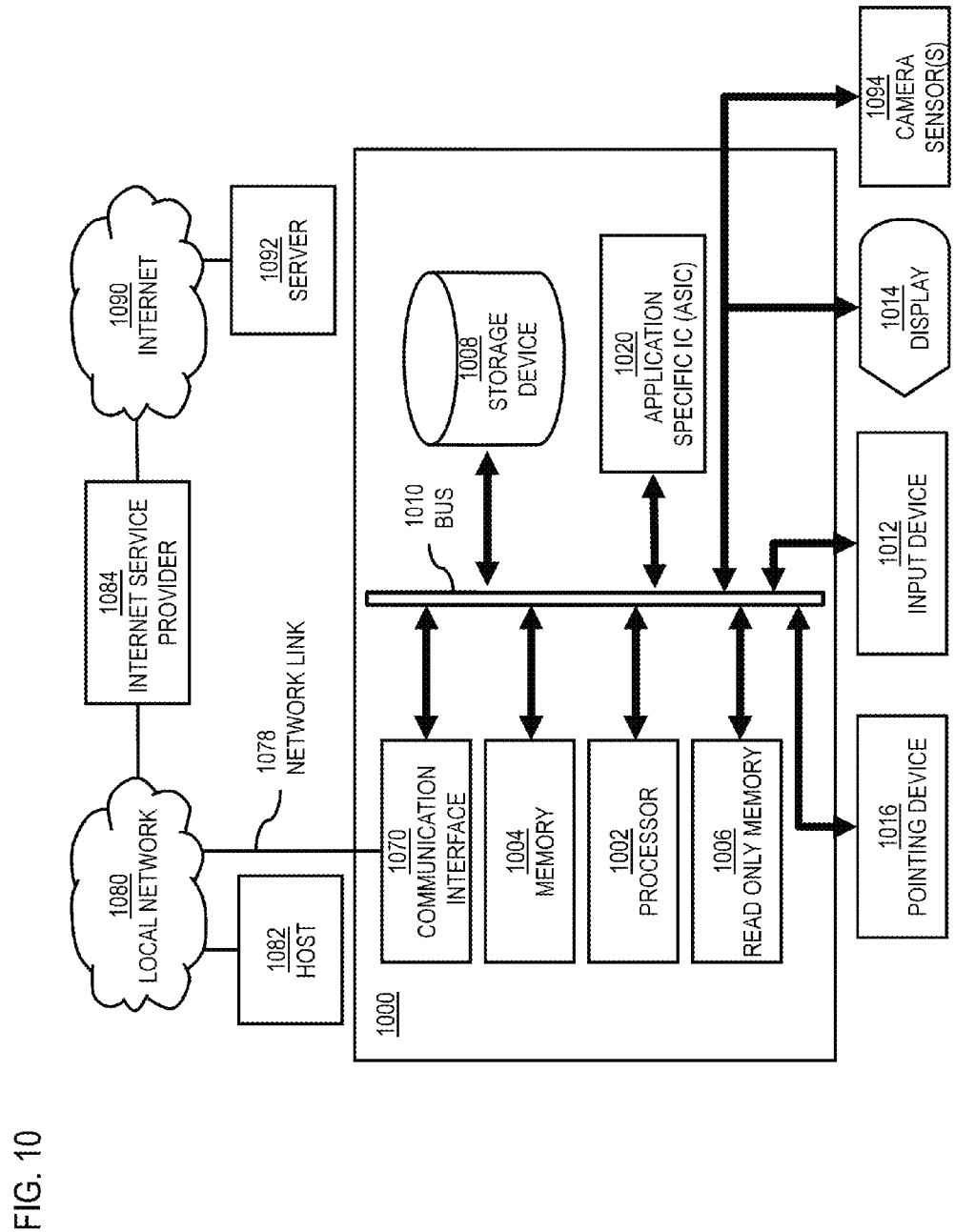
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to process one or more user inputs to identify at least one potential privacy conflict, thereby causing a collaboration of one or more privacy policies for at least one privacy preserving action as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of processing one or more user inputs to identify at least one potential privacy conflict, thereby causing a collaboration of one or more privacy policies for at least one privacy preserving action.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to process one or more user inputs to identify at least one potential privacy conflict, thereby causing a collaboration of one or more privacy policies for at least one privacy preserving action. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1000 also includes a memory 1004 coupled to bus 1010. The memory 1004, such as a random access memory (RAM) or any other dynamic storage device, stores information including processor instructions for processing one or more user inputs to identify at least one potential privacy conflict, thereby causing a collaboration of one or more privacy policies for at least one privacy preserving action. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for processing one or more user inputs to identify at least one potential privacy conflict, thereby causing a collaboration of one or more privacy policies for at least one privacy preserving action, is provided to the bus 1010 for use by the processor from an external input device 1012, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014, and one or more camera sensors 1094 for capturing, recording and causing to store one or more still and/or moving images (e.g., videos, movies, etc.) which also may comprise audio recordings. In some embodiments, for example, in embodiments in which the computer system 1000 performs all functions automatically without human input, one or more of external input device 1012, display device 1014 and pointing device 1016 may be omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 107 for processing one or more user inputs to identify at least one potential privacy conflict, thereby causing a collaboration of one or more privacy policies for at least one privacy preserving action to the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to process one or more user inputs to identify at least one potential privacy conflict, thereby causing a collaboration of one or more privacy policies for at least one privacy preserving action as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of processing one or more user inputs to identify at least one potential privacy conflict, thereby causing a collaboration of one or more privacy policies for at least one privacy preserving action.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to process one or more user inputs to identify at least one potential privacy conflict, thereby causing a collaboration of one or more privacy policies for at least one privacy preserving action. The memory 1105 also stores the data associated with or generated by the execution of the inventive steps.

Figure 12:
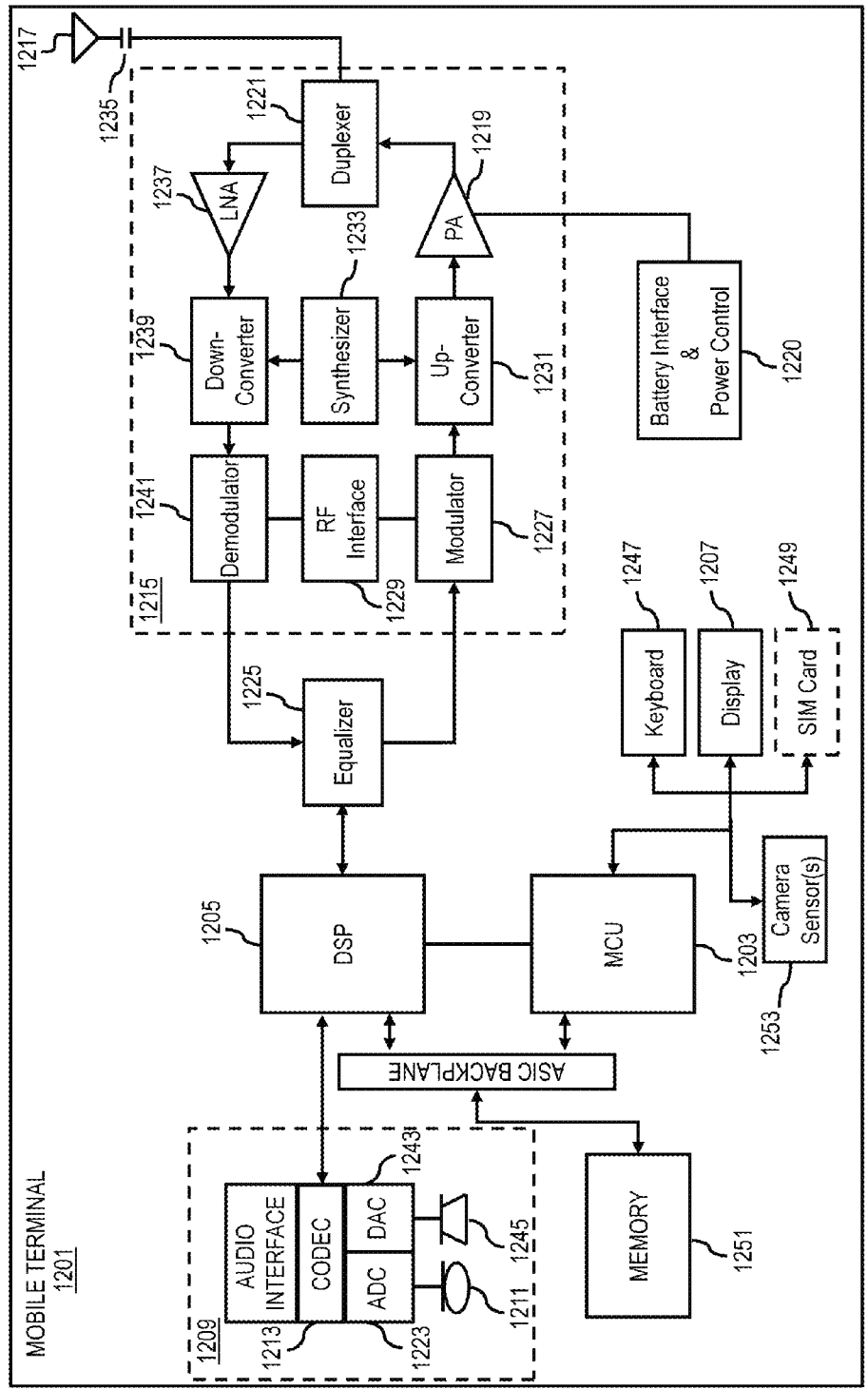
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of processing one or more user inputs to identify at least one potential privacy conflict, thereby causing a collaboration of one or more privacy policies for at least one privacy preserving action. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of processing one or more user inputs to identify at least one potential privacy conflict, thereby causing a collaboration of one or more privacy policies for at least one privacy preserving action. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to process one or more user inputs to identify at least one potential privacy conflict, thereby causing a collaboration of one or more privacy policies for at least one privacy preserving action. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

Further, one or more camera sensors 1253 may be incorporated onto the mobile station 1201 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of or processing (1) data or (2) information or (3) at least one signal, the (1) data or (2) information or (3) at least one signal based, at least in part, on the following:
    at least one determination of one or more user inputs for specifying configurable privacy-related data for at least one camera, wherein the one or more user inputs are associated with one or more users of the at least one camera;
    a processing of the one or more user inputs to identify at least one potential privacy conflict resulting from the one or more user inputs;
    an initiation of at least one privacy preserving action based, at least in part, on the at least one potential privacy conflict;
    an enforcement of collaborative privacy policies for at least one potential privacy conflict;
    a user supplied solution to resolve any privacy conflict, wherein the fixing of the at least one privacy conflict is based, at least in part, on a determination that majority users have reached at least one consensus threshold value with respect to the at least one privacy conflict; and
    a control of the at least one camera based, at least in part, on collaborative privacy policies.

2. The method of claim 1, wherein the (1) data or (2) information or (3) at least one signal are further based, at least in part, on the following:
    a creation of one or more forms for specifying the configurable privacy-related data,
    wherein the one or more user inputs are determined using the one or more forms.

3. The method of claim 1, wherein the (1) data or (2) information or (3) at least one signal are further based, at least in part, on the following:
    at least one determination of one or more privacy policies associated with the one or more users, the at least one camera, or a combination thereof; and
    at least one determination of the at least one privacy preserving action based, at least in part, on the one or more privacy policies.

4. The method of claim 1, wherein one or more configurable privacy-related data includes location information, temporal information, run-time duration information, functional attributes information, or a combination thereof.

5. The method of claim 1, wherein one or more user inputs includes privacy preference information, activity information, contextual information, restriction information, or a combination thereof.

6. The method of claim 2, wherein one or more forms includes a web page based, at least in part, on the configurable privacy-related data, privacy policies, or a combination thereof.

7. The method of claim 1, wherein the identification of at least one potential privacy conflict is based, at least in part, on a heuristic iteration, time-based operation, device capability to support user inputs, or a combination thereof.

8. The method of claim 1, wherein the user supplied solution is based, at least in part, on the following:
a presentation of one or more notification messages at the one or more devices associated with the at least one camera based, at least in part, on conflict resolution strategies.

9. The method of claim 1, wherein the user supplied solution is based, at least in part, on the following:
a negotiation between at least one device and at least one camera; and
an application of one or more conflict resolution strategies for determining one or more privacy policies for at least one camera based, at least in part, on the negotiation.

10. The method of claim 1, wherein the user supplied solution is based, at least in part, on the following:
a modification of one or more privacy policies for at least one camera based, at least in part, on departure of at least one user associated with at least one camera, addition of at least one other user to the camera, or a combination thereof; and
a repetition of conflict detection process, conflict resolution process, or a combination thereof based, at least in part, on the modification, on determination of an unsatisfactory outcome, or a combination thereof.

11. An apparatus comprising:
at least one processor; and
at least one memory including computer program code for one or more programs,
the at least one memory and the computer program code configured to, with the at least one processor, cause the apparatus to perform at least the following,
determine one or more user inputs for specifying configurable privacy-related data for at least one camera, wherein the one or more user inputs are associated with one or more users of the at least one camera;
process and/or facilitate a processing of the one or more user inputs to identify at least one potential privacy conflict resulting from the one or more user inputs;
cause, at least in part, an initiation of at least one privacy preserving action based, at least in part, on the at least one potential privacy conflict;
enforce collaborative privacy policies for at least one potential privacy conflict;
create a user supplied solution to resolve any privacy conflict, wherein the fixing of the at least one privacy conflict is based, at least in part, on a determination that majority users have reached at least one consensus threshold value with respect to the at least one privacy conflict; and
control of the at least one camera based, at least in part, on collaborative privacy policies.

12. The apparatus of claim 11, wherein the apparatus is further caused to:
cause, at least in part, a creation of one or more forms for specifying the configurable privacy-related data,
wherein the one or more user inputs are determined using the one or more forms.

13. The apparatus of claim 11, wherein the apparatus is further caused to:
determine one or more privacy policies associated with the one or more users, the at least one camera, or a combination thereof; and
determine the at least one privacy preserving action based, at least in part, on the one or more privacy policies.

14. The apparatus of claim 11, wherein one or more configurable privacy-related data includes location information, temporal information, run-time duration information, functional attributes information, or a combination thereof.

15. The apparatus of claim 11, wherein one or more user inputs includes privacy preference information, activity information, contextual information, restriction information, or a combination thereof.

16. The apparatus of claim 12, wherein one or more forms includes a web page based, at least in part, on the configurable privacy-related data, privacy policies, or a combination thereof.

17. The apparatus of claim 11, wherein the identification of at least one potential privacy conflict is based, at least in part, on a heuristic iteration, time-based operation, device capability to support user inputs, or a combination thereof.

18. The apparatus of claim 11, wherein the
user supplied solution includes at least in part, a presentation of one or more notification messages at the one or more devices associated with the at least one camera based, at least in part, on conflict resolution strategies.

19. The apparatus of claim 11, wherein the user supplied solution further causes the apparatus to:
cause, at least in part, a negotiation between at least one device and at least one camera; and
cause, at least in part, an application of one or more conflict resolution strategies for determining one or more privacy policies for at least one camera based, at least in part, on the negotiation.

20. The apparatus of claim 11, wherein the apparatus is further caused to:
cause, at least in part, a modification of one or more privacy policies for at least one camera based, at least in part, on departure of at least one user associated with at least one camera, addition of at least one other user to the camera, or a combination thereof; and
cause, at least in part, a repetition of conflict detection process, conflict resolution process, or a combination thereof based, at least in part, on the modification, on determination of an unsatisfactory outcome, or a combination thereof.

* * * * *